Nov. 28, 1933.  L. GRIES  1,937,146
METHOD OF ORNAMENTING METAL SURFACES
Filed March 4, 1931
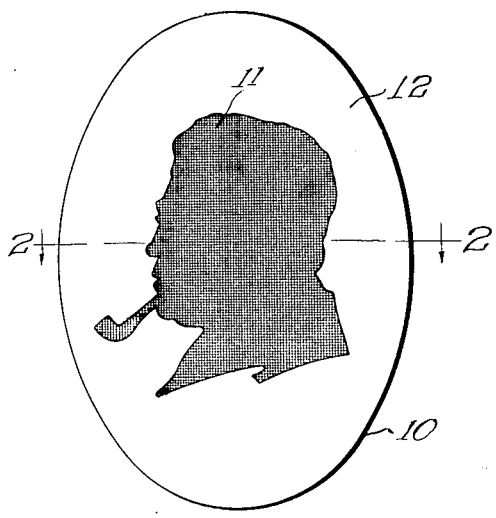
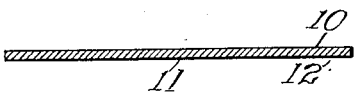
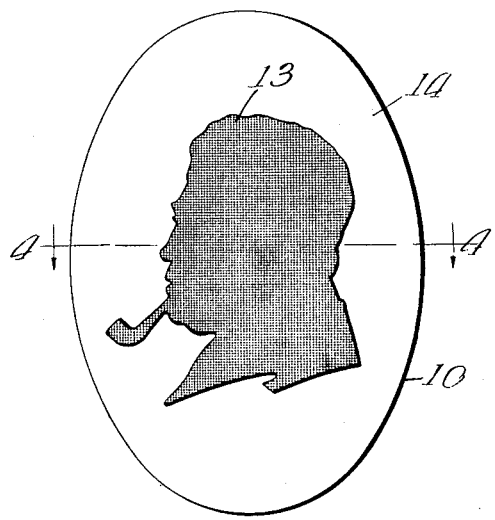
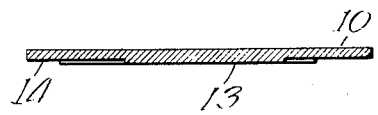

Patented Nov. 28, 1933

1,937,146

UNITED STATES PATENT OFFICE 1,937,146

METHOD OF ORNAMENTING METAL SURFACES

Louis Gries, Chicago, Ill.

Application March 4, 1931. Serial No. 520,099

3 Claims. (Cl. 95—5.7)

The invention relates to improvements in methods of ornamenting metal surfaces and has for its primary object the provision of an improved method of the character indicated by means of which metal surfaces of various kinds may be readily and economically ornamented with figures of various descriptions.

Another object of the invention is the provision of an improved method of the character indicated whereby such metal surfaces may be ornamented with silhouette figures in relief.

Other objects will appear hereinafter.

The invention consists in the methods of procedure hereinafter dscribed and claimed.

The invention will be best understood by reference to the accompanying drawing forming a part of the specification and in which Figure 1 is a face view of a medallion ornamented by a method embodying the invention;

Figure 2, a horizontal section of the same taken on line 2—2 of Fig. 1;

Figure 3, a view similar to Fig. 1 but showing the method employed in providing an ornamental figure in relief; and Figure 4, a section taken on line 4—4 of Fig. 3.

In carrying on the method, a silhouette photographic film negative is made by means of an exposure thereof in an ordinary camera. To make said silhouette negative, a powerful source of light is placed behind a semi-transparent white screen and the subject placed between this screen and the camera in such a way that a silhouette image is obtained on the negative. In the exemplification of the invention illustrated in the drawing, the subject is the profile of the head of a man smoking a pipe, and such treatment will result in the imprinting of his profile silhouette on a photographic negative. The film negative thus obtained is then developed in the usual way and dried.

The metal surface to be ornamented is then covered by a coating of light-sensitive material. In the exemplification illustrated, a smooth grained oval copper plate 10 has its face thoroughly cleaned by polishing with charcoal or powdered pumice which is then covered with a coating compound. For practical purposes, this coating may consist of the following emulsion:

Water _____ 30 ounces
Le Pages photo-engravers glue_____ 8 ounces
White of twelve eggs
Bichromate of ammonia_____ 25 grains
Aqua ammonia concentrated_____ 18 drops After the face of the plate is thoroughly covered with this coating, it is revolved over a gentle heat to cause even and rapid drying. This procedure should be carried out in a dark room or in a very weak light and until the emulsion coating is thoroughly dry. The heating is then discontinued and the plate allowed to cool.

After said plate has cooled, the photographic negative prepared as stated above is placed in contact with the coated side of the plate and the negative then exposed to a source of bright light. The exposure to the light will cause the emulsion under the transparent portions of the negative to become insoluble, the other portions, that is, the portions around the silhouette image remaining soluble.

After this exposure, the plate is washed in water to remove the soluble portions of the coating, thereby leaving the surface of the plate coated only to correspond with the silhouette image. The resultant plate is then slowly dried by baking under heat and said baking is continued until the image becomes uniformly black. The plate is then placed on a slab and allowed to cool.

To finish the plate, it is dipped in the following solution:

Water _____ 1 gallon
Sodium bichromate _____ 5.6 ounces
Commercial sulphuric acid_____ 5.6 ounces It is permitted to remain in this solution for a few minutes and until a satin finish is obtained on the uncoated portions or silhouette background of the plate. The plate is then dried and sprayed with lacquer to prevent injury or corrosion and is then completed for use. An exemplification of a plate or medallion thus produced is shown in Figs. 1 and 2 of the drawing in which the background is indicated by the reference numeral 12 and the silhouette image by the numeral 11.

In Figs. 3 and 4 of the drawing, I have illustrated an etched plate produced by means of the process as follows. To accomplish this after the baking process to produce the black image, the plate is cooled and the back thereof coated with shellac which is permitted to dry. The plate thus prepared is then dipped in a solution of perchloride of iron which attacks and dissolves the uncoated background portions 14 of the plate, dissolving the same and thereby etching to the desired depth to place the black image 13 in relief or outwardly offset. When the desired depth of etch is obtained, the plate is removed from the perchloride solution and thoroughly rinsed in water and dried.

The plate thus produced is then dipped in the bichromate or finishing solution and finished as above specified for completing the medallion.

Another method of finishing the plate or medallion is as follows. After the plate has been baked and etched as above set forth, the image coating is removed with alcohol or gasoline and the plate then electroplated, as with nickel. This will form the silhouette figure or image in relief and nickel plated so as to guard against injury or corrosion.

The ornamental metal surfaces thus produced may be employed for ornamenting medallions, watch cases or other metal surfaces and the figures formed thereon in silhouette may, of course, be varied infinitely. In this manner, metal surfaces may be provided with various forms of desirable ornamentation at comparatively little cost.

While I have illustrated and described the preferred form of construction for carrying my invention into effect, this is capable of variation and modification without departing from the spirit of the invention. I, therefore, do not wish to be limited to the precise details of construction set forth but desire to avail myself of such variations and modifications as come within the scope of the appended claims.

I claim:

1. The method of ornamenting the surface of a metal soluble in chromic acid which consists in first covering said surface with a light-sensitive coating; then exposing said surface to light passing through a photographic negative; then washing said surface in water; then slowly drying the surface by the application of heat continued until the image becomes uniformly black; and then cooling the surface and dipping the same in a solution of sodium bichromate and sulphuric acid.

2. The method of ornamenting the surface of a metal soluble in perchloride of iron which consists in first covering said surface with a light-sensitive coating; then exposing said surface to light passing through a photographic negative; then washing said surface in water; then slowly drying the surface by the application of heat continued until the image becomes uniformly black; then subjecting said surface to the action of a solution of perchloride of iron; and then subjecting the surface to the action of a solution of sodium bichromate and sulphuric acid.

3. The method of ornamenting the surface of a metal soluble in perchloride of iron which consists in forming a figure thereon coated to protect it from chemical action; then subjecting said surface to the action of a solution of perchloride of iron; and then subjecting said surface to the action of a solution of sodium bichromate and sulphuric acid.

LOUIS GRIES.